United States Patent [19]

Hunter

[11] 4,246,253

[45] Jan. 20, 1981

[54] MNO$_2$ DERIVED FROM LIMN$_2$O$_4$

[75] Inventor: James C. Hunter, Berea, Ohio

[73] Assignee: Union Carbide Corporation, New York, N.Y.

[21] Appl. No.: 947,120

[22] Filed: Sep. 29, 1978

[51] Int. Cl.³ .............................................. C01G 45/02
[52] U.S. Cl. .................................... 423/605; 429/224
[58] Field of Search ................ 423/605; 439/193, 224

[56] References Cited

U.S. PATENT DOCUMENTS

| 3,427,128 | 2/1969 | Schmier | 423/605 |
|---|---|---|---|
| 3,856,576 | 12/1974 | Prieto | 423/605 |
| 3,959,021 | 5/1976 | Nishino et al. | 423/605 |

FOREIGN PATENT DOCUMENTS

| 714989 | 8/1965 | Canada | 423/605 |
|---|---|---|---|
| 1152095 | 8/1959 | Fed. Rep. of Germany | 423/605 |
| 1443907 | 5/1966 | France | 423/605 |
| 51-24999 | 7/1976 | Japan | 423/605 |

OTHER PUBLICATIONS

Moroson et al., "Chemical Absts.", vol. 44, 1950, p. 65i.
Buller et al., "Journal of The Electrochemical Soc.", vol. 100, 1953, pp. 297–301.
Beley et al., "Electrochimica Acta," vol. 18, 1973, pp. 1008–1011.

Primary Examiner—Herbert T. Carter
Attorney, Agent, or Firm—Cornelius F. O'Brien

[57] ABSTRACT

A new form of manganese dioxide having an x-ray diffraction pattern resembling none of the x-ray patterns of the known forms of manganese dioxide is manufactured by acid treatment of LiMn$_2$O$_4$.

8 Claims, 1 Drawing Figure

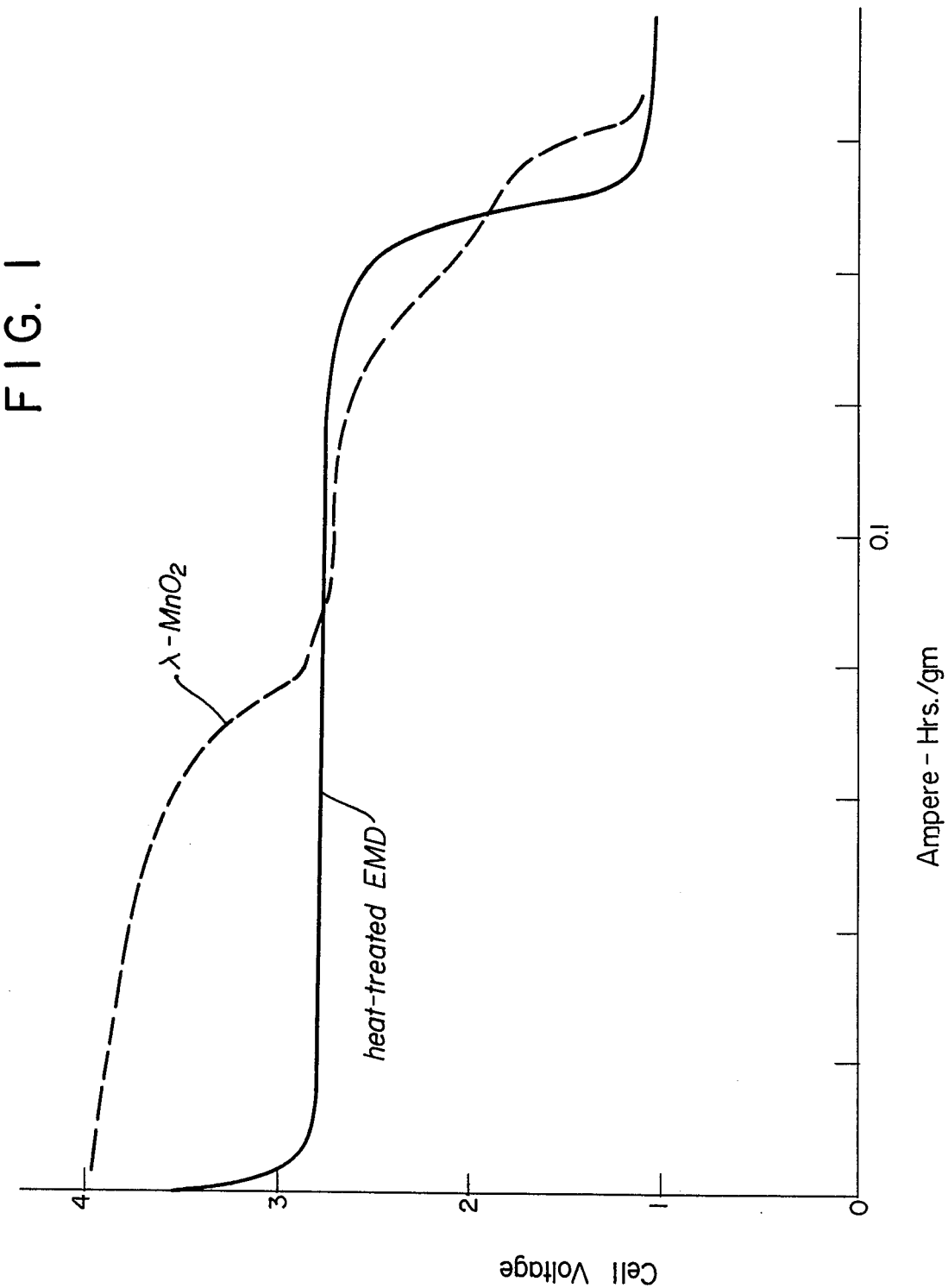

MNO₂ DERIVED FROM LIMN₂O₄

This invention relates to a new form of manganese dioxide and a method for preparing the same. In particular this invention relates to a new form of manganese dioxide having an x-ray diffraction pattern not heretofore exhibited by any previously known forms of manganese dioxide.

This invention provides a novel form of manganese dioxide which is made by acid treatment of the known material $LiMn_2O_4$.

Manganese dioxide ($MnO_2$) is a well-known substrance commonly used in electrochemical cells, such as dry cell batteries, as an active cathode material. Manganese dioxide has been known to exist in various crystalline forms among which pyrolusite and nsutite are commonly found in nature. Ramsdellite is also found in nature, but to a lesser extent. Other forms of manganese dioxide are known, either naturally occurring or manmade, but none of these alone or in combination has the x-ray diffraction pattern of the manganese dioxide of this invention.

$LiMn_2O_4$, a spinel, is reported by Wickham and Croft (D. G. Wickham & W. J. Croft, J. Phys. Chem. Solids, 7, 351 (1958)) to form whenever lithium carbonate and any oxide of manganese are taken in a 2:1 molar ratio of Mn/Li, and heated at 800°–900° C. in air. The product $LiMn_2O_4$ (a blue colored material) contains equal amounts of Mn(III) and Mn(IV), and accordingly has a manganese peroxidation value of 75% (% peroxidation is defined as the degree to which the manganese oxidation state has been raised from Mn(II) to Mn(IV). Thus, MnO has 0% peroxidation and $MnO_2$ has 100% peroxidation). Wickham and Croft also reported that using excess Li in the reaction led to formation of a mixture of $LiMn_2O_4$ and $Li_2MnO_3$ (a red material), while excess Mn led to a mixture containing $Mn_2O_3$ in addition to the $LiMn_2O_4$. It should be noted that other preparative techniques are possible for preparing $LiMn_2O_4$, in addition to those described by Wickham and Croft. Other lithium or manganese compounds can be used as starting materials provided they decompose to lithium or manganese oxides under the reaction conditions used.

The novel manganese dioxide of this invention is made by acid treatment of $LiMn_2O_4$. The product of the acid treatment is a substantially pure $MnO_2$ whose x-ray pattern is nearly identical to that of the starting material $LiMn_2O_4$, a spinel. The x-ray pattern of the $MnO_2$ of this invention differs from that of $LiMn_2O_4$ in that there is a slight shift in peak positions, indicating a lattice contraction upon formation of the novel form of manganese dioxide, which we shall refer to hereinafter as "$\lambda MnO_2$". The "$\lambda$" designation, to the best of our knowledge, has not been used in the art to designate a form of $MnO_2$. Thus, while $LiMn_2O_4$ is a cubic spinel with $a_o = 8.24$ Å, $\lambda MnO_2$ appears to have a closely related structure with a $_o = 8.07$ Å $\pm 0.02$ Å. The term "$a_o$" as used herein is the well-known term used in crystallography which refers to the edge dimension of the cubic unit cell. A range of compositions intermediate between $LiMn_2O_4$ and $\lambda$-$MnO_2$ can be produced by controlling the acid treating conditions, and such compositions can be represented by the empirical formula $Li_xMn_2O_4$ where $0 < x > 1$, and have x-ray patterns with characteristics and both $LiMn_2O_4$ and $\lambda$-$MnO_2$.

X-ray diffraction is a well-known and reliable test method for the determination of the structure of crystals. When a crystalline structure is bombarded with x-rays, some of the x-rays are scattered and changes in the phase relations between the rays scattered by different atoms in the crystal result in a diffraction pattern characteristic of the spatial arrangement of the atoms in the crystal. The positions of the diffraction lines in a typical x-ray pattern are often referred to as d-values, indicated in angstroms (Å), and correspond to the plane spacings in the bombarded crystal. These plane spacings and the relative intensities of the lines are characteristic of the structure of a given crystal. Identification of a substance by its x-ray diffraction pattern may be achieved by direct comparison with the patterns of known substances, which is made easier through the use of published x-ray patterns classified in the card index of the American Society for Testing and Materials (ASTM).

For the determination of the x-ray patterns of the materials described herein conventional powder diffraction techniques were used. The radiation was Fe K$\alpha$, or Cu K$\alpha$, and a conventional scintillation counter detector was used, with the resulting peaks displayed on a strip chart recorder. d-values for the diffraction lines were calculated from the line positions and the wavelength of the impinging radiation, using standard tables.

The ideal starting material for preparing $\lambda$-$MnO_2$ is $LiMn_2O_4$, which has a Mn peroxidation value of 75%. However, in practice, it has been found that satisfactory results are obtained over a range of Mn peroxidation values, where the Mn/Li ratio in the starting mixture used to form $LiMn_2O_4$ varies somewhat from the ideal 2:1. As explained by Wickham and Croft, for Mn/Li of less than 2:1 (i.e. excess Li) some $Li_2MnO_3$ forms. This is a distinctively red material, containing Mn(IV). It is not affected by acid treatment, and it is of very low electrochemical activity. Even at a 2:1 Mn/Li ratio some of this material is often seen, probably due to incomplete reaction to form $LiMn_2O_4$, because of localized variations of the Mn/Li ratio in the starting mixture. The use of a slight (up to 10%) excess Mn in the initial mixture used to form $LiMn_2O_4$ tends to prevent formation of $Li_2MnO_3$ and ultimately results in $\lambda$-$MnO_2$ of good activity. Thus, the optimum material for forming $\lambda$-$MnO_2$ is a $LiMn_2O_4$ prepared in such a way as to be free of $Li_2MnO_3$, and where some excess $Mn_2O_3$ can be tolerated; where the peroxidation is in the range of 70–75%.

In accordance with the present invention there is provided a new crystalline form of manganese dioxide with an x-ray diffraction pattern having d-values of 4.64 Å, 2.42 Å, 2.31 Å, 2.01 Å, 1.84 Å, 1.55 Å and 1.42 Å $\pm 0.02$ Å in each instance.

In accordance with the present invention there is also provided a method for producing the manganese dioxide of this invention which encompasses acid-treating $LiMn_2O_4$ under conditions specified in more detail hereinafter.

The treatment procedure typically involves suspending $LiMn_2O_4$ in water at room temperature by stirring, and then adding acid while continuing to stir and while monitoring the pH of the solution phase. For satisfactory conversion, on the order of greater than about 90% of the $LiMn_2O_4$ to the $\lambda$-$MnO_2$ of this invention, acid treatment should continue until the pH of the solution phase stabilizes at below about pH 2.5, preferably below about 2. If a manganese oxide ore containing large amounts of impurities is used as a starting material to make the $LiMn_2O_4$, then a more severe acid treatment, (i.e., stronger acid and/or higher temperature) may be required to remove the acid-soluble impurities while achieving the desired conversion to the λ-MnO₂.

The acids which are suitable for treating LiMn₂O₄ in the practice of this invention include, but are not limited to acids such as H₂SO₄, HCl, or HNO₃; other suitable acids selected by those skilled in the art may be employed. The acids may be used in dilute concentrations generally on the order of about 1 to about 10 normality.

The manganese dioxide of this invention is suitable for use in a number of applications where manganese dioxide has been employed in the past. The most extensive use of manganese dioxide has been in electrochemical cells, in particular in dry cell batteries, which typically comprise a manganese dioxide cathode, a zinc anode, and an aqueous electrolyte (such as aqueous NH₄Cl and ZnCl₂ solutions). While the most widely used electrolytes in dry cells have been in aqueous form, the manganese dioxide of this invention is especially useful with non-aqueous electrolytes, such as those comprising organic solutions of light metal salts such as LiBF₄ in propylene carbonate-dimethoxyethane, or LiAsF₆ in methyl formate-propylene carbonate, and should also be useful with solid electrolytes such as lithium-substituted beta-alumina.

In the drawing:

FIG. 1: is a graph showing discharge behavior of λ-MnO₂ in comparison with that of heat treated EMD in a non-aqueous electrolyte as explained more fully in Example IV hereinafter.

The following examples are set forth as being merely illustrative of the invention and are not intended in any manner to be limitative thereof. Unless otherwise indicated, all parts and percentages are by weight.

EXAMPLE I

This example illustrates the preparation of λ-MnO₂.

20 gms of β-MnO₂ (reagent grade pyrolusite) were ground together with 4.25 gms of Li₂CO₃, heated in air to 835° C. for 10 minutes, cooled, and then reheated to 850° C. in air for one hour, and cooled to room temperature. The resulting reaction product was a blue powder found to be substantially pure LiMn₂O₄. About 15 gms of this reaction product were placed in a beaker, about 400 mls water added, and while stirring, 15% H₂SO₄ was slowly added until the solution phase pH stabilized at 2. After allowing solid material to settle the supernatant liquid was decanted and the remaining solid was washed by decantation until the wash solutions were neutral. The solid was then collected on a sintered glass filter funnel and dried in an oven at about 85° C. An x-ray diffraction pattern of the resulting dried product was obtained which was almost identical to that of LiMn₂O₄, but shifted to lower d-values. Table 1 presents the x-ray diffraction pattern for the LiMn₂O₄ prepared above, and the above dried, acid-treated product. Also presented in the Table for comparison are data from the ASTM card 18–736, for LiMn₂O₄ as compiled by the "American Society for Testing and Materials." Chemical analysis, by conventional methods, of the acid-treated product indicated that the LiMn₂O₄ had been converted to substantially pure MnO₂. The results of the chemical analysis are presented in Table 2.

TABLE 1

| | X-RAY DIFFRACTION d-VALUES AND RELATIVE INTENSITIES Fe KαRADIATION | | | | | | |
|---|---|---|---|---|---|---|---|
| LiMn₂O₄ prepared in Example I | 4.73Å(s) | 2.48Å(s) | 2.38Å(w) | 2.06Å(s) | 1.89Å(w) | 1.58Å(w) | 1.46Å(m) |
| Dried, acid treated product of Example I | 4.64Å(s) | 2.42Å(s) | 2.31Å(w) | 2.01Å(s) | 1.84Å(w) | 1.55Å(w) | 1.42Å(m) |
| ASTM card 18-736 for LiMn₂O₄ | 4.72Å(s) | 2.47Å(s) | 2.37Å(w) | 2.05Å(s) | 1.88Å(w) | 1.58Å(m) | 1.45Å(s) | s = strong
m = medium
w = weak

TABLE 2

| | % Mn | %MnO₂ | % Peroxidation | % Li |
|---|---|---|---|---|
| Theoretical for LiMn₂O₄ | 60.77 | 72.12 | 75 | 3.83 |
| LiMn₂O₄ of Example I | 62.54 | 72.53 | 74 | 3.0 |
| Dried, acid-treated product | 60.39 | 93.22 | 99 | 0.27 |

EXAMPLE II

This example illustrates a preferred method of making LiMn₂O₄ and also illustrates the use of different acids to convert LiMn₂O₄ to the λ-MnO₂ of this invention.

140.23 gms Li₂CO₃ and 600 gms Mn₂O₃ were ground together, heated in air at 850° C. for 1 hours; then cooled to room temperature, reground, then reheated at 850° C. for ½ hour.

Three 15 gm samples of the resulting LiMn₂O₄ were placed in beakers with 500 ml H₂O, and treated with 3 N HCl, 4.7 N H₂SO₄, and 4 N NHO₃, respectively, to a pH of slightly below 2. The samples were then water washed until neutral, filtered and dried at ~95° C. X-ray results (Table 3) and analytical results (Table 4) confirm that in all cases the LiMn₂O₄ was converted to substantially pure λ-MnO₂.

TABLE 3

| | X-RAY DIFFRACTION d-VALUES AND INTENSITIES (Cu KαRADIATION) | | | | | | | |
|---|---|---|---|---|---|---|---|---|
| LiMn₂O₄, prepared in Example II | 4.79Å(s) | 2.49Å(m) | 2.39Å(w) | | 2.07Å(m) | 1.89Å(w) | 1.59Å(w) | 1.46Å(w) |
| Dried, HCl treated product | 4.62Å(s) | 2.41Å(m) | 2.32Å(w) | 2.05Å(w) | 2.01Å(m) | 1.84Å(w) | 1.55Å(w) | 1.42Å(w) |
| Dried, H₂SO₄ treated product | 4.64Å(s) | 2.42Å(m) | 2.31Å(w) | 2.05Å(w) | 2.01Å(m) | 1.84Å(w) | 1.55Å(w) | 1.42Å(w) |
| Dried, HNO₃ | 4.64Å(s) | 2.42Å(m) | 2.32Å(w) | 2.05Å(w) | 2.01Å(m) | 1.86Å(w) | 1.55Å(w) | 1.42Å(w) |

TABLE 3-continued

X-RAY DIFFRACTION d-VALUES AND INTENSITIES (Cu KαRADIATION)

treated product s = strong
m = medium
w = weak

Note: The additional weak 2.05 Å peaks occurring in the acid treated products, are probably due to tiny amounts of unconverted $LiMn_2O_4$ remaining in the products.

TABLE 4

|  | % Mn | %MnO$_2$ | % Peroxidation |
|---|---|---|---|
| Theoretical for LiMn$_2$O$_4$ | 60.77 | 72.12 | 75 |
| LiMn$_2$O$_4$ Prepared in Example II | 60.36 | 70.91 | 75 |
| Dried, H$_2$SO$_4$ treated Product | 62.10 | 95.79 | 99 |
| Dried, HCl treated Product | 62.67 | 95.62 | 98 |
| Dried, HNO$_3$ treated Product | 62.08 | 95.55 | 97 |

EXAMPLE III

This example illustrates the use of an elevated temperature acid treatment. 60 gms. African MnO$_2$ ore containing about 74% MnO$_2$ was ground with 10.3 gms Li$_2$CO$_3$, then heated at 850° C. in air for 1 hour. The sample was cooled, reground, then reheated at 850° C. for 1 hour more. The product showed the x-ray pattern of LiMn$_2$O$_4$, and had 51.76% Mn, 57.04% MnO$_2$, 70% peroxidation. The analytical results indicated that impurities were present, carried over from the ore.

Treating a 15 gm sample of the LiMn$_2$O$_4$ product with H$_2$SO$_4$ to a pH of 2 resulted in a product which has 75.82% MnO$_2$, 92% peroxidation, and which showed the λ-MnO$_2$ x-ray pattern, indicating conversion to the new form of MnO$_2$. However, the low % MnO$_2$ seen in the analytical results indicated that the ore impurities remained high in the product.

A second 15 gm sample of the Li$_2$CO$_3$-treated ore was acid-treated, again to a pH of 2, but this time the treating solution was heated to 90° C. and maintained at that temperature for 30 minutes prior to washing with water. The resultant product now had 84.3% MnO$_2$ and 97% peroxidation and still showed the λ-MnO$_2$ x-ray pattern.

EXAMPLE IV

An 8.2 mg sample of λ-MnO$_2$ made according to the process described in Example II above, using H$_2$SO$_4$, was placed on a porous nickel substrate and discharged versus a lithium anode in an electrolyte consisting of 1 M LiBF$_4$ in 1:1 (volume ratio) propylene carbonate-dimethoxyethane. The current drain was 500 microamperes. For comparison, a similar sized (7.8 mg) sample of EMD (electrolytic manganese dioxide), heat treated for 8 hours at 350°-360° C. to optimize its performance in the non-aqueous electrolyte, was also discharged under the same conditions.

The results are graphed in FIG. 1; the horizontal axis is expressed in ampere-hours per gram, allowing the normalization of the curves for differing sample weights. The vertical axis shows the cell voltages during discharge. The resulting discharge curves show that the λ-MnO$_2$ has about the same total ampere-hour capacity as the EMD, but operates at a much higher voltage for the first half of the discharge.

Although the present invention has been described and set forth in some detail, it should be further understood that the same is susceptible to changes, modifications and variations without departing from the scope and spirit of the invention.

What is claimed is:

1. A manganese dioxide composition having the x-ray diffraction pattern:

| dA |
|---|
| 4.64 ± 0.02 |
| 2.42 ± 0.02 |
| 2.31 ± 0.02 |
| 2.01 ± 0.02 |
| 1.84 ± 0.02 |
| 1.55 ± 0.02 |
| 1.42 ± 0.02 |

2. The manganese dioxide of claim 1 wherein the relative intensities of the x-ray diffraction peaks are as follows:

| dA | Relative Intensity (Fe Kα Radiation) |
|---|---|
| 4.64 ± 0.02 | S |
| 2.42 ± 0.02 | S |
| 2.31 ± 0.02 | W |
| 2.01 ± 0.02 | S |
| 1.84 ± 0.02 | W |
| 1.55 ± 0.02 | W |
| 1.42 ± 0.02 | M |

3. The manganese dioxide of claim 1 or 2 wherein the relative intensities of the x-ray diffraction peaks are as follows:

| dA | Relative Intensity (Cu KαRadiation) |
|---|---|
| 4.64 ± 0.02 | S |
| 2.42 ± 0.02 | M |
| 2.31 ± 0.02 | W |
| 2.01 ± 0.02 | M |
| 1.84 ± 0.02 | W |
| 1.55 ± 0.02 | W |
| 1.42 ± 0.02 | W |

4. A method of manufacturing a manganese dioxide composition as defined in claim 1 comprising acid-treating LiMn$_2$O$_4$ with an aqueous acid solution until the pH of the solution stabilizes below about 2.5.

5. The method of claim 4 wherein the acid treatment comprises the steps of:
 (a) suspending LiMn$_2$O$_4$ in water;
 (b) adding aqueous acid solution while stirring;
 (c) monitoring the pH of the solution phase; and
 (d) continuing the acid addition until the pH of the solution phase stabilizes at below about pH 2.5.

6. The method of claim 5 comprising the additional steps of:
 (e) washing until the wash water is about neutral;
 (f) filtering; and
 (g) drying the MnO$_2$ product.

7. The method of claims 5 or 6 wherein the acid addition step (d) is continued until the pH of the solution phase stabilizes at below about pH 2.0.

8. The method of claims 5 or 6 wherein the acid is selected from the group consisting of sulfuric acid, hydrochloric acid, and nitric acid.

* * * * *